(12) United States Patent
Yamada et al.

(10) Patent No.: US 11,597,275 B2
(45) Date of Patent: Mar. 7, 2023

(54) WORK VEHICLE

(71) Applicant: Kubota Corporation, Osaka (JP)

(72) Inventors: Masahiro Yamada, Sakai (JP);
Hirokazu Ito, Sakai (JP); Tomohiko Hisakuni, Sakai (JP)

(73) Assignee: Kubota Corporation, Osaka (JP)

( * ) Notice: Subject to any disclaimer, the term of this patent is extended or adjusted under 35 U.S.C. 154(b) by 97 days.

(21) Appl. No.: 17/074,829

(22) Filed: Oct. 20, 2020

(65) Prior Publication Data

US 2021/0300179 A1  Sep. 30, 2021

(30) Foreign Application Priority Data

Mar. 24, 2020  (JP) .............................. JP2020-052469

(51) Int. Cl.
| | | |
|---|---|---|
| *B60K 26/02* | (2006.01) | |
| *F16D 1/00* | (2006.01) | |
| *G05G 1/04* | (2006.01) | |
| *G05G 5/03* | (2008.04) | |
| *G05G 7/00* | (2006.01) | |
| *A01D 34/00* | (2006.01) | |
| *A01D 34/82* | (2006.01) | |
| *A01D 101/00* | (2006.01) | |

(52) U.S. Cl.
CPC .............. *B60K 26/02* (2013.01); *F16D 1/00* (2013.01); *G05G 1/04* (2013.01); *G05G 5/03* (2013.01); *G05G 7/00* (2013.01); *A01D 34/006* (2013.01); *A01D 34/824* (2013.01); *A01D 2101/00* (2013.01); *G05G 2505/00* (2013.01); *G05G 2700/16* (2013.01)

(58) Field of Classification Search
CPC .. F16D 1/00; G05G 2505/00; G05G 2700/16; G05G 7/00
See application file for complete search history.

(56) References Cited

U.S. PATENT DOCUMENTS

| | | |
|---|---|---|
| 8,240,420 B1 | 8/2012 | Bartel et al. |
| 8,660,744 B2 | 2/2014 | Derby et al. |
| 2009/0005219 A1 | 1/2009 | Miyazaki et al. |
| 2012/0186887 A1 | 7/2012 | Moriguchi et al. |
| 2017/0088202 A1* | 3/2017 | Yasunobe ............... F16H 61/24 |
| 2017/0120922 A1* | 5/2017 | Schaedler ............. B60W 10/20 |

FOREIGN PATENT DOCUMENTS

| | | |
|---|---|---|
| CN | 1927617 A | 3/2007 |
| EP | 2543244 A1 | 1/2013 |
| JP | 9100908 A | 4/1997 |
| JP | 9123784 A | 5/1997 |
| JP | 9164852 A | 6/1997 |
| JP | 20097882 A | 1/2009 |
| JP | 201355 A | 1/2013 |
| JP | 2016198009 A | 12/2016 |

\* cited by examiner

*Primary Examiner* — Vicky A Johnson
(74) *Attorney, Agent, or Firm* — The Webb Law Firm

(57) ABSTRACT

In a work vehicle, a pivot axis of an operating lever and a rotary axis of a potentiometer are located on a same axis. An interlocking mechanism includes an input part which inputs power of the operating lever following the operating lever about the pivot axis as a pivot, and an output part which is supported to a rotary operation shaft and outputs power of the input part to the rotary operation shaft. The input part and the output part are operably connected via a connecting pin.

7 Claims, 8 Drawing Sheets

WORK VEHICLE

CROSS-REFERENCE TO RELATED APPLICATION

This application claims priority to Japanese Patent Application No. 2020-052469 filed Mar. 24, 2020, the disclosure of which is hereby incorporated by reference in its entirety.

BACKGROUND OF THE INVENTION

1. Field of the Invention

The invention relates to a work vehicle such as a riding type mower.

2. Description of the Related Art

There is a work vehicle including a driving device which drives a traveling device and which allows speed change, a pivot-operable operating lever which performs speed change operation of the driving device, a rotary type potentiometer which detects an operation position of the operating lever, and a controlling means which performs speed change of the driving device based on a detection result of the potentiometer.

Such type of work vehicle is disclosed in JP 2013-000055 A, for example, wherein a mower is shown as a work vehicle.

In the mower shown in JP2013-000055A, there are provided an electric motor for travelling as the driving device which drives rear wheels, and a traveling speed change lever as the operating lever which performs speed change of the electric motor for traveling. Also, there are provided a potentiometer which detects an operation position of the traveling speed change lever, and a control device as the controlling means which controls the electric motor for traveling based on detection information of the potentiometer.

In the work vehicle described above, as an interlocking mechanism which interlocks the operating lever with the potentiometer, the mechanism shown in FIG. 8 can be conceivable. That is, there are provided an input part 23 which pivots in interlocking with pivoting of the operating lever 12 about a pivot axis P1 of the operating lever 12 as a pivot, and inputs power of the operating lever 12; and an output part 24 which extends from a rotary operation shaft 13b of a potentiometer 13, pivots about a rotary axis P2 of the rotary operation shaft 13b as the pivot, and outputs power of the input part 23 to the rotary operation shaft 13b. The input part 23 and the output part 24 are interlocked via an elongate hole 31 provided at the input part 23 and via a connecting pin 32 provided at the output part 24, the connecting pin 32 slidably engaging with the elongate hole 31.

In the case of this interlocking mechanism, if dust gets into the elongate hole, operational failure occurs that motion of the connecting pin is disabled due to dust becoming resistance, or that the connecting pin does not move due to the dust getting stuck. Also, if the connecting pin is adapted to slide smoothly, connecting play between the input part and the output part develops due to the elongate hole, and detection error due to the potentiometer occurs.

Therefore, there is a demand for a work vehicle in which the interlocking mechanism moves smoothly and an accurate detection result can be obtained.

SUMMARY OF THE INVENTION

In view of the above, the work vehicle with a configuration as below is proposed.

A work vehicle comprising:
a traveling device;
a driving device which drives the traveling device;
a pivot operation type operating lever which performs speed change operation of the driving device;
a rotary type potentiometer which detects an operation position of the operating lever;
a controlling means which operates speed change of the driving device based on a detection result of the potentiometer; and
an interlocking mechanism which interlocks the operating lever with a rotary operation shaft of the potentiometer;
wherein a pivot axis of the operating lever and a rotary axis of the rotary operation shaft are located on a same axis, and
wherein the interlocking mechanism includes:
an input part which pivots following the operating lever about the pivot axis of the operating lever as a pivot, and inputs power of the operating lever,
an output part which is supported to the rotary operation shaft of the potentiometer and outputs power of the input part to the rotary operation shaft, and
a connecting pin which operably connects the input part and the output part with each other.

With this configuration, the input part and the output part are operably connected via the connecting pin to pivot about the common axis as the pivot, whereby pivoting of the operating lever is transmitted to a rotary operation shaft of the potentiometer. Thus, there is no need to provide a connecting hole, such as an elongated hole, which is sized larger than the connecting pin, at the input part and the output part. Therefore, an interlocking mechanism may move smoothly without causing operational failure and the potentiometer may operate in accurate association with the operating lever, so that an accurate detection result may be obtained.

In a preferred embodiment, the rotary operation shaft protrudes from a meter case of the potentiometer to a side where the operating lever is located.

With this configuration, compared with protruding of the rotary operation shaft from the meter case to an opposite side of the operating lever side, the output part may be positioned closer to the operating lever, with a smaller size in a direction along a pivot axis and a rotary axis of the interlocking mechanism.

In a preferred embodiment, the input part is located on a side where the potentiometer is located, relative to the operating lever.

With this configuration, compared with locating the input part on the opposite side of the side where the potentiometer is located relative to the operating lever, the input part may be located closer to the potentiometer, with a smaller size in the direction along the pivot axis and the rotary axis of the interlocking mechanism.

In a preferred embodiment, the work vehicle further comprises a damper which is connected to the input part and which acts on the operating lever.

With this configuration, the damper may act on the operating lever, with a simple configuration in which the input part is utilized for a member which interlocks the damper with the operating lever.

Other features and advantages therefrom will be apparent upon reading the description as below.

DETAILED DESCRIPTION OF PREFERRED EMBODIMENT

An embodiment of the invention will be described hereinafter with reference to the drawings.

Figure 1:
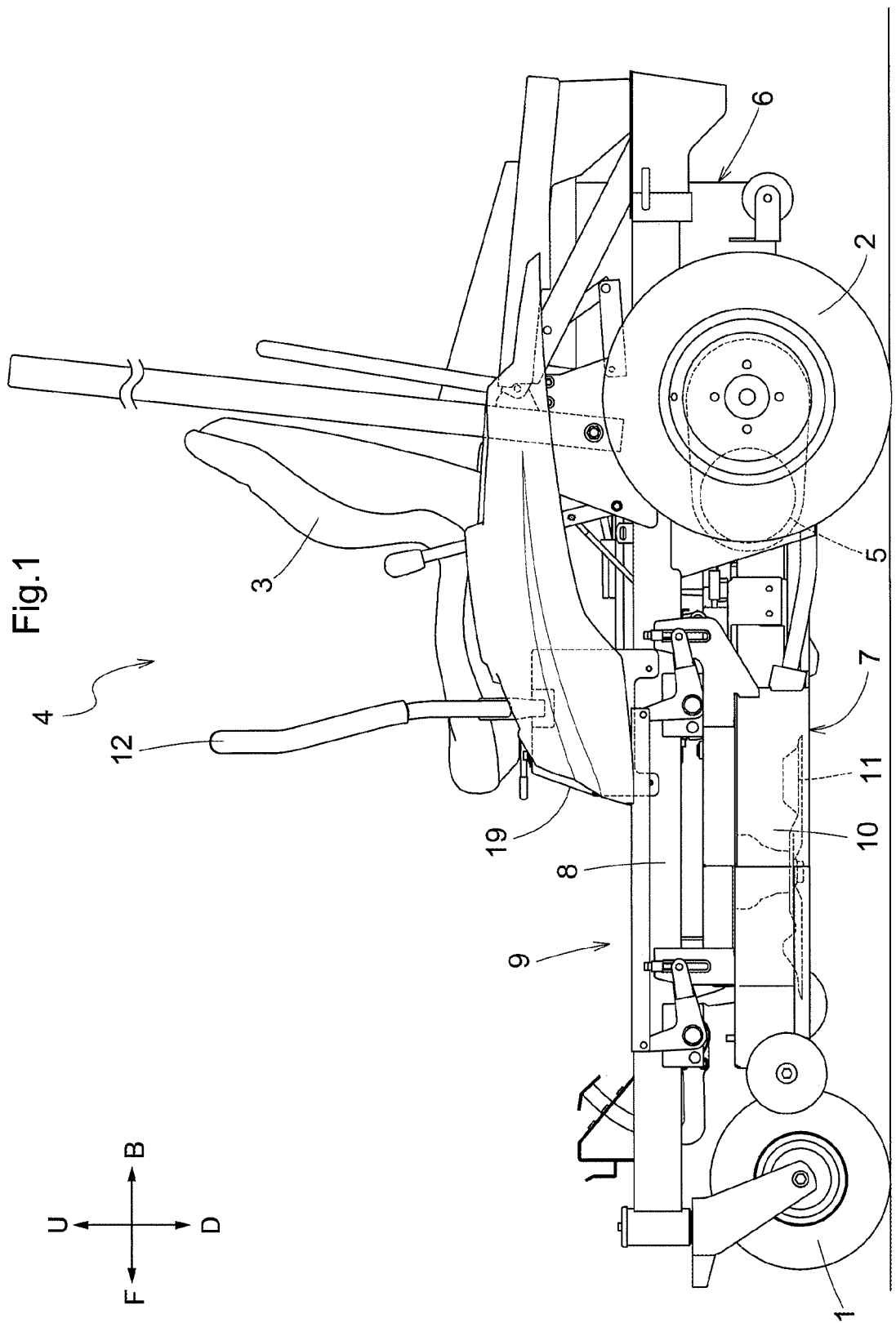
FIG. 1 is a left side view showing an overall riding-type mower.
Figure 2:
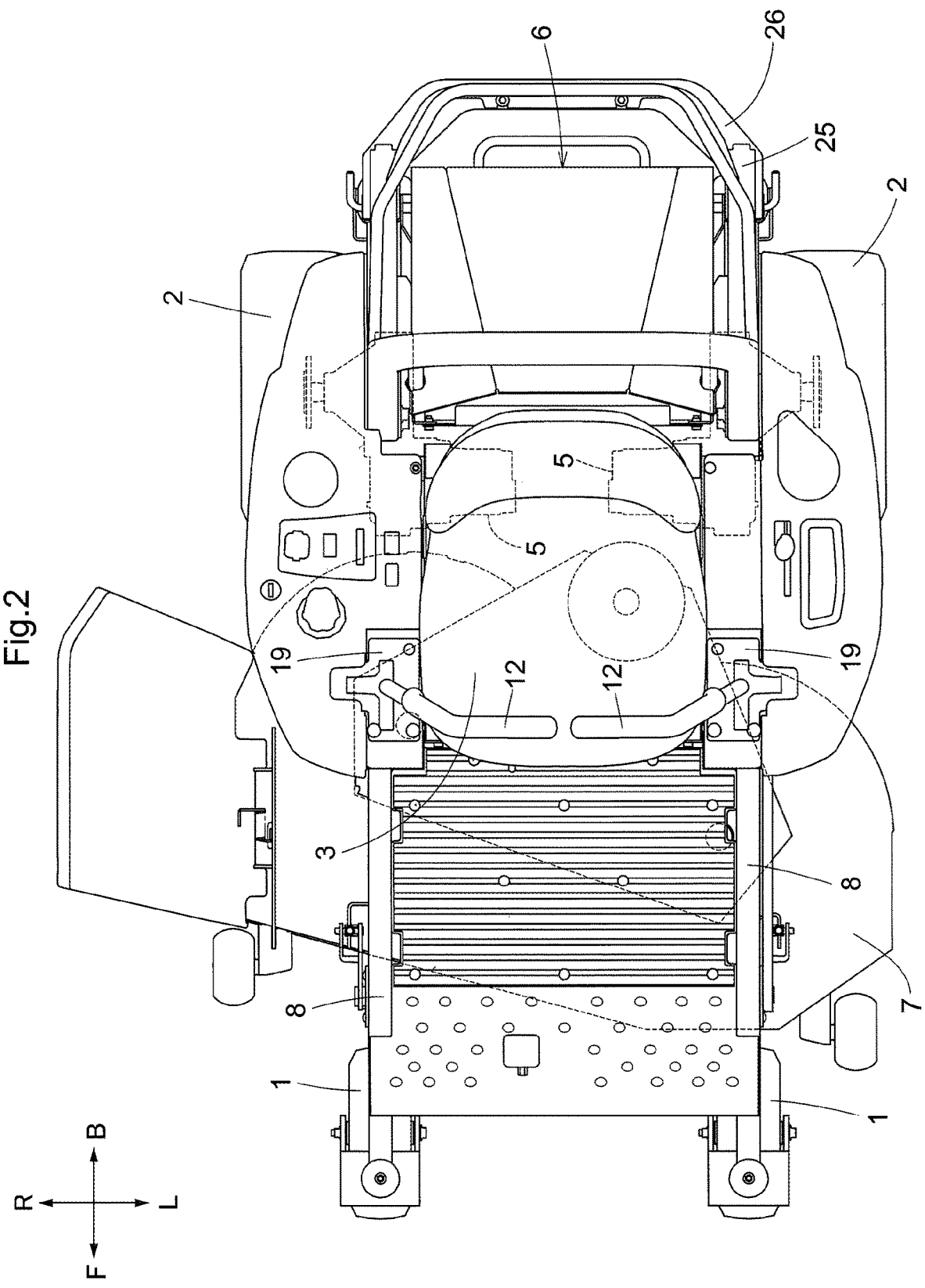
FIG. 2 is a plan view showing the overall riding-type mower.

In the following description, with regard to a traveling vehicle body of a riding-type mower (an example of "work vehicle"), the direction of arrow F shown in FIG. 1 and FIG. 2 is defined as "front side of the vehicle body", the direction of arrow B shown is defined as "rear side of the vehicle body", the direction of arrow U shown in FIG. 1 is defined as "upper side of the vehicle body", the direction of arrow D is defined as "lower side of the vehicle body", the direction of arrow L shown in FIG. 2 is defined as "left side of the vehicle body", and the direction of arrow R is defined as "right side of the vehicle body".

[Overall Configuration of Riding-Type Mower]

As shown in FIG. 1 and FIG. 2, a riding-type mower is provided with a traveling vehicle body 1 including a pair of right and left front wheels 1 freely rotatably and a pair of right and left rear wheels 2 (an example of "traveling device") drivably. The pair of right and left front wheels 1 are configured as a caster wheel type. At a front part of the traveling vehicle body, a driving section 4 having a driver's seat 3 is formed. At the driving section 4, there are provided the driver's seat 3 and a pair of right and left operating levers 12 which perform traveling operation and steering operation of the traveling vehicle body. Downwardly of the driving section 4, there is provided a pair of right and left traveling electric motors 5 (an example of "driving device") which separately drive the pair of right and left rear wheels 2. At a rear part of the traveling vehicle body, there is provided a battery pack 6 which supplies electric power to the pair of right and left traveling electric motors 5. Between the front wheels 1 and the rear wheels 2, there is provided a mowing device 7. The mowing device 7 is supported to a vehicle body frame 8 via a link mechanism 9 which lifts the mowing device 7 up/down relative to the driving vehicle body. The mowing device 7 includes a cutting blade housing 10, and inside the cutting blade housing 10, there is provided a cutting blade 11 which is configured to be rotatable and drivable, about a support shaft (not shown) as a pivot which extends in a direction along the vertical direction of the vehicle body.

[Traveling Operation and Steering Operation of Traveling Vehicle Body]

As shown in FIG. 1 and FIG. 2, at the driving section 4, there are provided the pair of right and left operating levers 12 which perform traveling operation and steering operation of the traveling vehicle body. The right and left operating levers 12 are provided in distribution on two lateral sides of the driver's seat 3.

Figure 3:
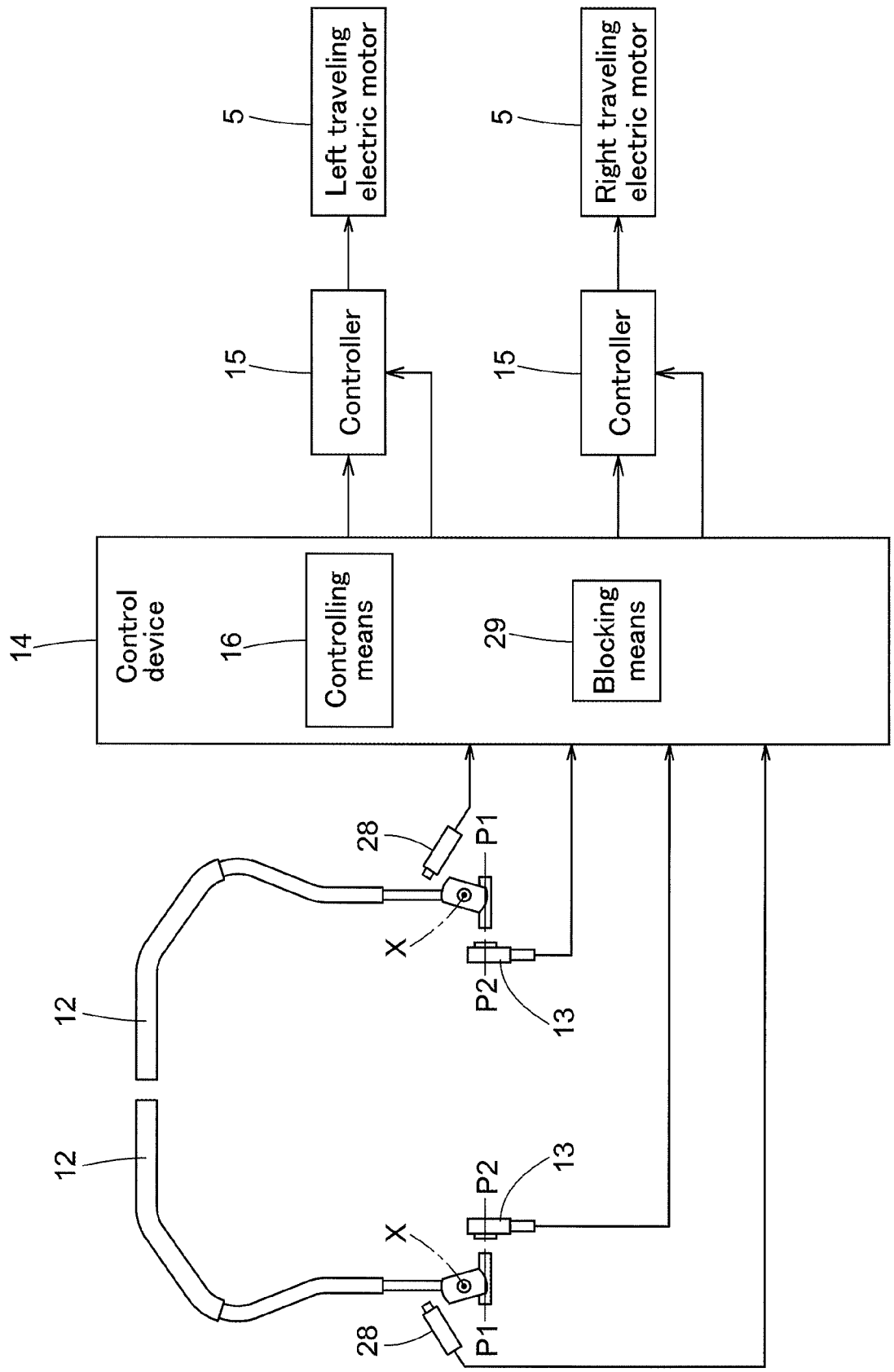
FIG. 3 is a block diagram of travelling control and steering control.

As shown in FIG. 3, the respective right and left operating levers 12 are configured such that a potentiometer 13 detects an operation position of the operating lever 12 at the time when the operating lever 12 is pivotally operated about a pivot axis P1 as a pivot. The potentiometers 13 of the right and left operating levers 12 are linked to a control device 14. The left traveling electric motor 5 as a speed-variable driving device which drives the left rear wheel 2, and the right traveling electric motor 5 as a speed-variable driving device which drives the right rear wheel 2 are linked to the control device 14. In the right and left traveling electric motors 5, there are provided controllers 15 which perform switching between forward drive and reverse drive of the respective traveling electric motors 5, and changing forward rotational speed and reverse rotational speed of the respective traveling electric motors 5. The control device 14 is configured by utilizing a microcomputer, and the control device 14 includes a controlling means 16 which operates the traveling electric motors 5 by controlling the respective controllers 15.

When the left operating lever 12 is pivotally operated in a front-rear direction of the vehicle body, a detection result by the potentiometer 13 corresponding to the left operating lever 12 is received by the control device 14, and the controlling means 16 acts based on the received detection result. Then, the left controller 15 is controlled by the controlling means 16, and the left traveling electric motor 5 is operated by the controller 15. When the right operating lever 12 is pivotally operated in the front-rear direction of the vehicle body, the right traveling electric motor 5 is operated by the controller 15 in the same way as when the left operating lever 12 is pivotally operated. When the right and left traveling electric motors 5 are operated so as to rotate at a same rotation speed as a forward-movement driving state, the right and left rear wheels 2 are driven at the same rotation speed on a forward moving side, and the traveling vehicle body travels straight to the forward moving side. When the right and left traveling electric motors 5 are operated so as to rotate at a same rotation speed as a reverse-movement driving state, the right and left rear wheels 2 are driven at the same rotation speed on a reverse moving side, and the traveling vehicle body travels straight to the reverse moving side. When the right and left traveling electric motors 5 are operated so as to rotate at different rotation speeds, the right and left rear wheels 2 are driven at different rotation speeds, and the traveling vehicle body turns, with the rear wheel 2 on a lower speed side being on an inner side in turning.

[Configuration to Detect Operation Position of Operating Lever by Potentiometer]

Figure 4:
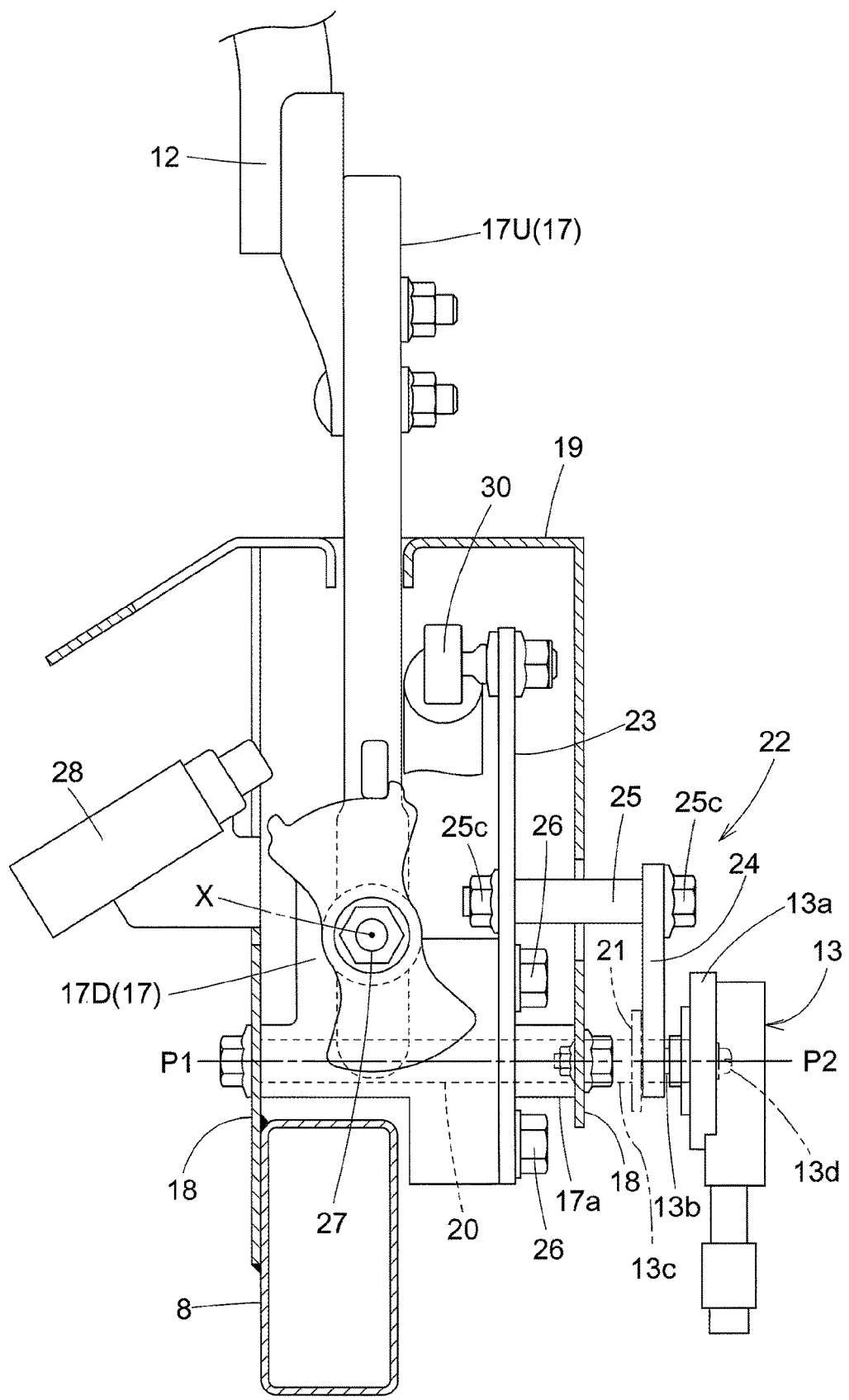
FIG. 4 is a front view showing an operating lever, a potentiometer and an interlocking mechanism.
Figure 5:
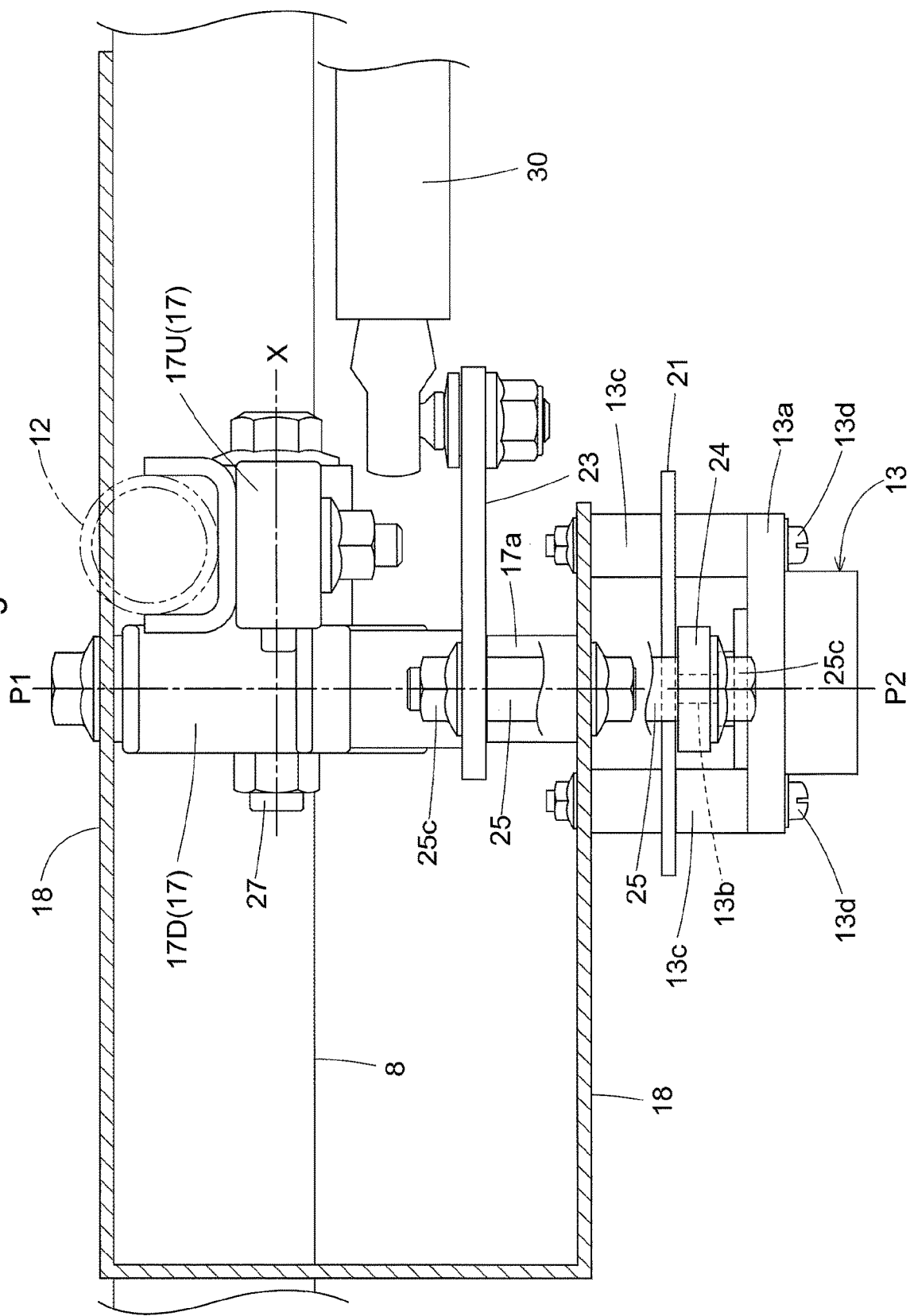
FIG. 5 is a plan view showing the operating lever, the potentiometer and the interlocking mechanism.
Figure 6:
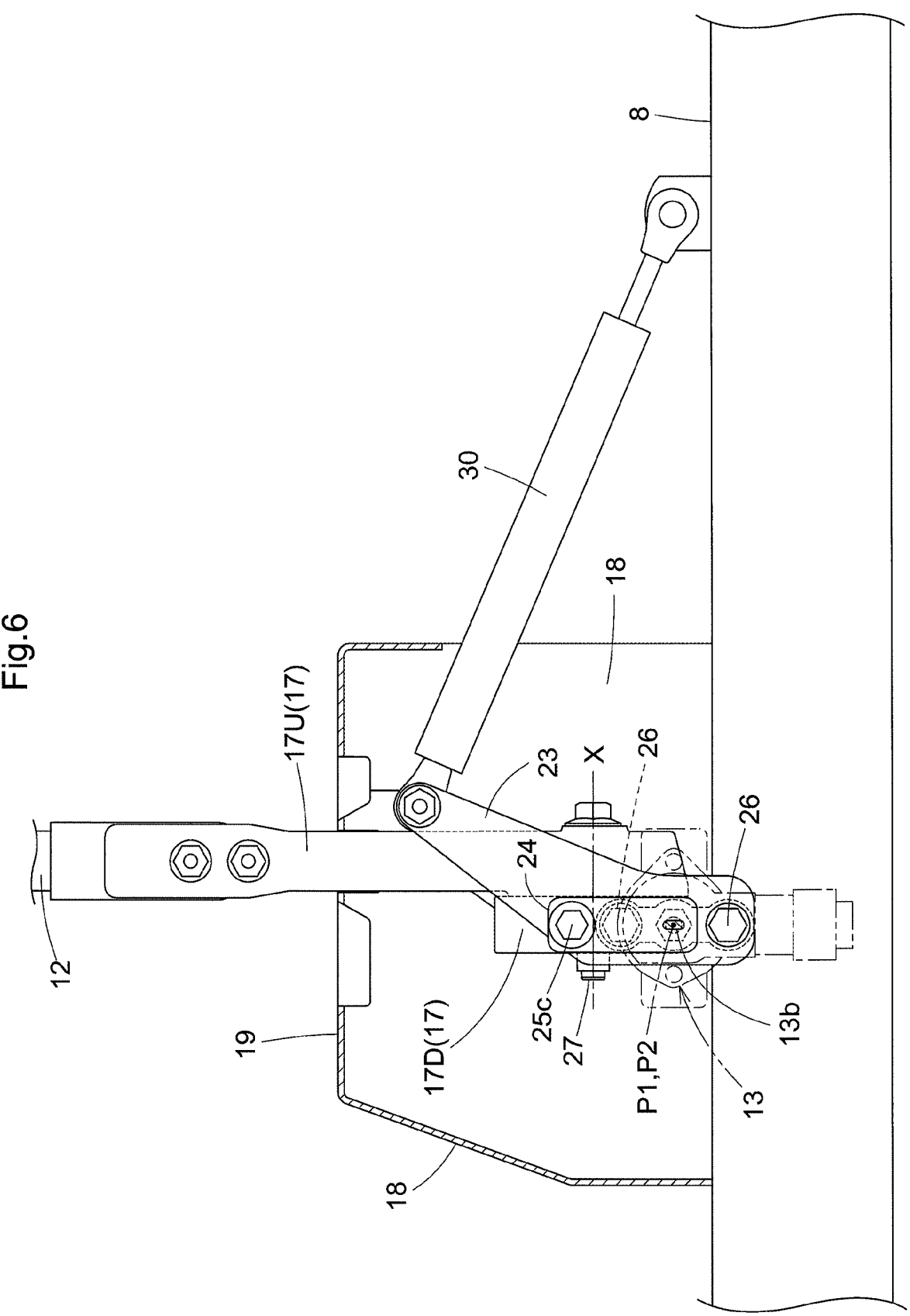
FIG. 6 is a side view showing the operating lever, the potentiometer and the interlocking mechanism.
Figure 7:
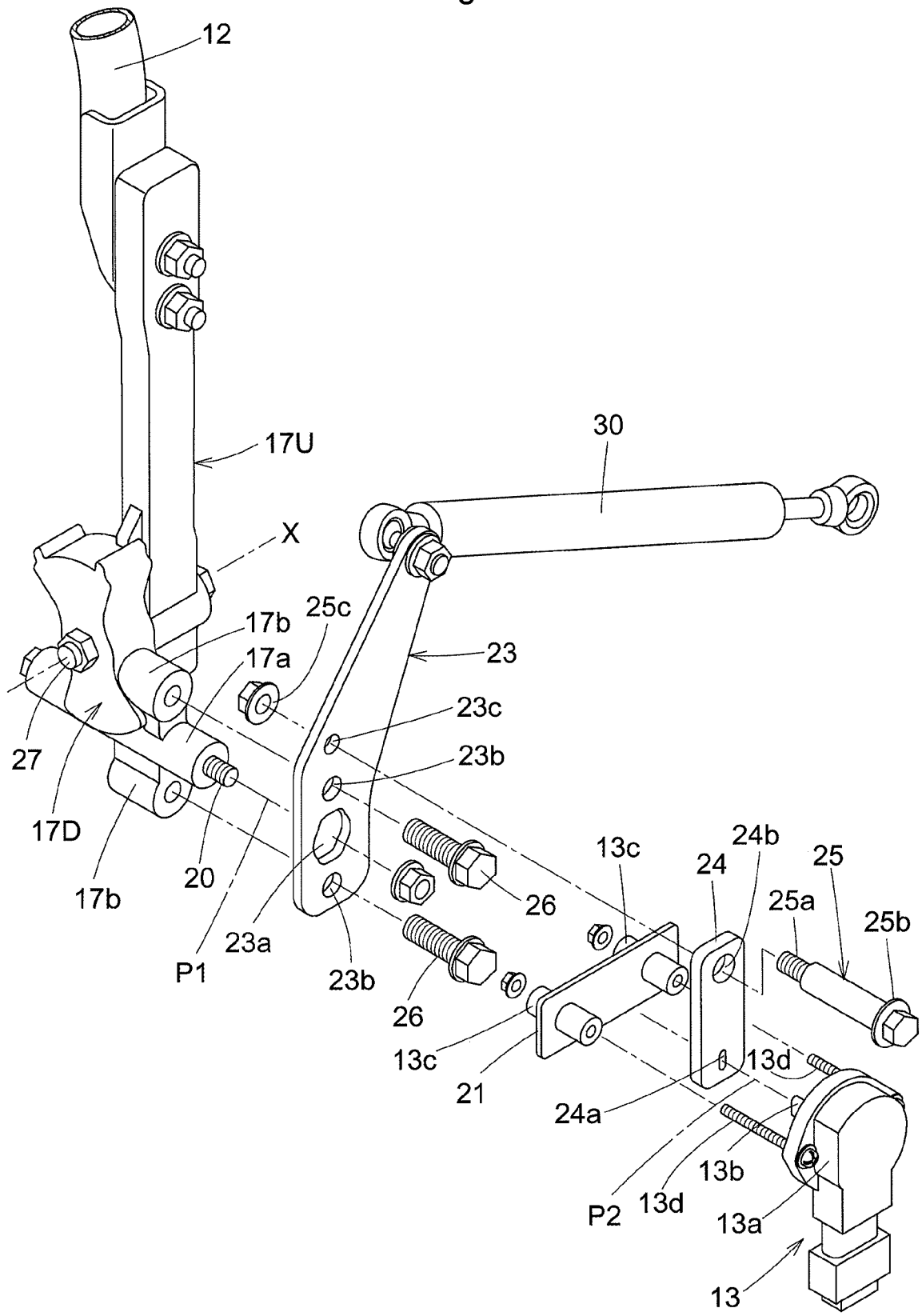
FIG. 7 is a perspective view showing a supporting block, the potentiometer and a disassembled interlocking mechanism.
Figure 8:
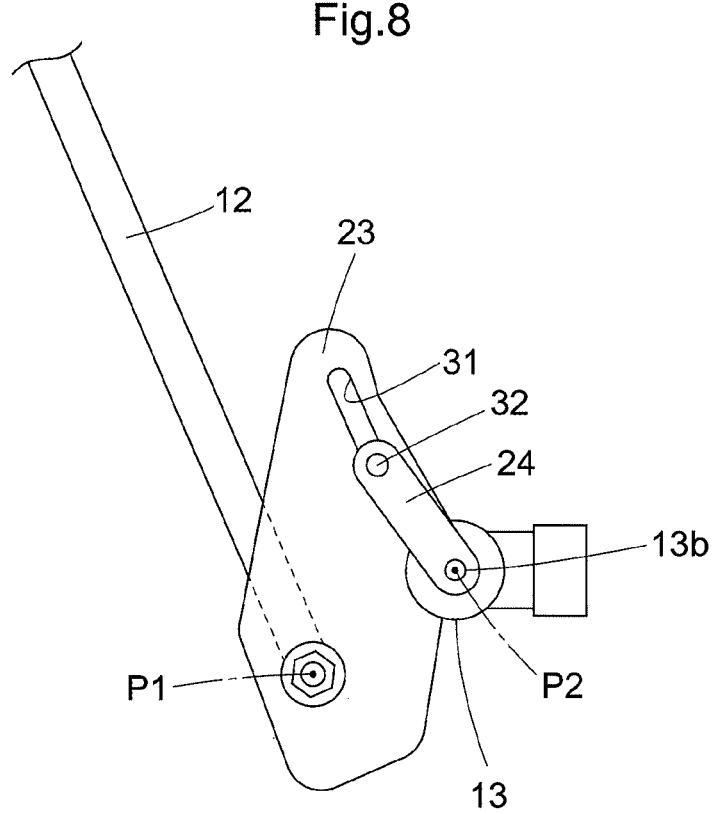
FIG. 8 is a side view showing an interlocking mechanism having a comparative structure.

As shown in FIG. 4 and FIG. 7, each of the right and left operating levers 12 has a supporting block 17 which is attached to a base part of the operating lever 12. As shown in FIG. 4, FIG. 5 and FIG. 6, the operating lever 12 is supported to right and left supporting members 18 via the supporting block 17. The right and left supporting members 18 are configured by a lever guide 19 (see FIG. 2) which is supported to the vehicle body frame 8 in such a manner as to cover the supporting block 17, etc. The supporting block 17 has a boss part 17a formed at a lower part of the supporting block 17 and a support shaft 20 fitted in the boss part 17a, and is pivotably supported to the right and left supporting members 18 via the support shaft 20. The support shaft 20 has a pivot axis P1 thereof extending in a direction along a lateral width direction of the vehicle body. Each of the right and left operating levers 12 is supported to the supporting members 18 associated therewith, to be pivotally operable in the front-rear direction of the vehicle body about the pivot axis P1 as the pivot.

As shown in FIG. 7, the right/left potentiometer 13 has a rotary operation shaft 13b protruding from a meter case 13a. The potentiometer 13 is configured of a rotation type, wherein in response to rotary operation of the rotary operation shaft 13b, the potentiometer 13 is configured to output, as a detection result, an electric signal corresponding to an operation position of the rotary operation shaft 13b.

As shown in FIG. 4, FIG. 5 and FIG. 6, the potentiometer 13 associated with the right/left operating lever 12 is supported to one of the supporting members 18 in an attachment posture in which the rotary operation shaft 13b protrudes from the meter case 13a toward the operating lever 12 and in which a rotary axis P2 of the rotary operation shaft 13b extends concentric with the pivot axis P1 of the operating lever 12. The one of the supporting members 18 which supports the potentiometer 13 is one located on an inner side in a lateral direction of the vehicle body relative to the supporting block 17.

As shown in FIG. 4 and FIG. 5, the potentiometer 13 is supported to the supporting member 18 via a pair of attaching shafts 13c. Specifically, as shown in FIG. 7, the potentiometer 13 includes the pair of attaching shafts 13c. As shown in FIG. 4 and FIG. 5, the pair of attaching shafts 13c are arranged between the meter case 13a and the supporting member 18, and fastened and connected to the meter case 13a and the supporting member 18 by a screw member 13d. The pair of attaching shafts 13c are arranged in distribution on a front side and a rear side relative to the rotary operation shaft 13b. As shown in FIG. 5 and FIG. 7, the pair of attaching shafts 13c are interconnected by a connecting member 21. The connecting member 21 is connected to a portion of the attaching shaft 13c closer to the meter case 13a and away from the supporting member 18.

[Interlocking Mechanism between Operating Lever and Potentiometer]

The operating lever 12 and the rotary operation shaft 13b of the potentiometer 13 are interlocked by an interlocking mechanism 22. As shown in FIG. 4, FIG. 5 and FIG. 6, the interlocking mechanism 22 includes the input part 23 which inputs pivoting of the operating lever 12, an output part 24 which outputs power inputted by the input part 23 to the rotary operation shaft 13b of the potentiometer 13, and a connecting pin 25 which operably connects the input part 23 and the output part 24 with each other.

As shown in FIG. 4, FIG. 5 and FIG. 6, the input part 23 is arranged on a side where the potentiometer 13 is located relative to the operating lever 12, and is supported to the supporting block 17. Specifically, as shown in FIG. 7, the input part 23 includes an attaching hole 23a which is provided in a base part of the input part 23, and two first connecting holes 23b which are provided in distribution to an upper part and a lower part relative to the attaching hole 23a. As shown in FIG. 4, FIG. 5 and FIG. 6, the base part of the input part 23 is fitted on the boss part 17a of the supporting block 17 via the attaching hole 23a. The base part of the input part 23 is connected to the supporting block 17 via connecting bolts 26 which are attached to the two first connecting holes 23b and are fastened to a supporting part 17b (see FIG. 7) formed in the supporting block 17. The input part 23 is supported to the supporting block 17; and when the operating lever 12 is pivoted in the front-rear direction of the vehicle body, the input part 23 is pivotally operated about the pivot axis P1 as the pivot, by the supporting block 17 which pivots together with the operating lever 12.

As shown in FIG. 4, FIG. 5 and FIG. 6, the output part 24 is supported to the rotary operation shaft 13b of the potentiometer 13, with the rotary operation shaft 13b being rotatable. Specifically, as shown in FIG. 7, the output part 24 has a first connecting hole 24a which is provided in a base part of the output part 24. As shown in FIG. 4 and FIG. 5, the output part 24 is fitted on the rotary operation shaft 13b of the potentiometer 13 via the first connecting hole 24a. With non-circular shapes of the first connecting hole 24a and of the rotary operation shaft 13b, the output part 24 is engaged with the rotary operation shaft 13b not to be rotatable relative thereto. The output part 24 is received and supported by the connecting member 21, which is located on an opposite side of the meter case 13a relative to the output part 24, so as not to come off the rotary operation shaft 13b.

As shown in FIG. 4, FIG. 5 and FIG. 6, the connecting pin 25 is connected to a free end side part of the input part 23 and a free end side part of the output part 24, thus operably connecting the input part 23 and the output part 24. Specifically, as shown in FIG. 7, the connecting pin 25 includes a screw shaft portion 25a formed at an end part of the connecting pin 25, and a stopper portion 25b formed at the other end part of the connecting pin 25. As shown in FIG. 4, FIG. 5 and FIG. 6, the connecting pin 25 is attached between/across a through hole 24b (see FIG. 7) provided in the output part 24 and a through hole 23c (see FIG. 7) provided in the input part 23. Detachment of the connecting pin 25 from each of the input part 23 and the output part 24 is prevented by a retainer screwed member 25c attached to the screw shaft portion 25a, and by the stopper portion 25b.

In the interlocking mechanism 22, if the operating lever 12 is pivotally operated in the front-rear direction of the vehicle body, the supporting block 17 pivots together with the operating lever 12, and the input part 23 pivots following the operating lever 12 about the pivot axis P1 thereof as the pivot, so that power is inputted from the operating lever 12 by the input part 23. The inputted power is transmitted to the output part 24 by the connecting pin 25, so that the power is outputted from the output part 24 to the rotary operation shaft 13b. Thus, when the operating lever 12 is pivotally operated in the front-rear direction of the vehicle body, the rotary operation shaft 13b of the potentiometer 13 is rotatably operated in association with the front-rear pivoting of the operating lever 12, and the potentiometer 13 outputs an electric signal corresponding to an operation position of the operating lever 12 as a detection result.

As shown in FIG. 6, a damper 30 is connected to/between the free end side part of the input part 23, and a part of the vehicle body frame 8 located on the rear side relative to a part of the vehicle body frame 8 supporting the operating lever 12. The damper 30 is configured to act on the operating lever 12 via the input part 23 and the supporting block 17. Whereby, each of the input part 23 and the supporting block 17 are utilized as a member for connecting the damper 30 with the operating lever 12.

As shown in FIG. 4, FIG. 5, FIG. 6 and FIG. 7, the supporting block 17 includes a lower block portion 17D which is pivotably supported to the supporting members 18 via the support shaft 20, and an upper block portion 17U which is pivotably supported to the lower block portion 17D via a second support shaft 27, and to which the operating lever 12 is supported. The second support shaft 27 has a second pivot axis X extending along the front-rear direction of the vehicle body. The operating lever 12 is supported to the right and left supporting members 18, to be pivotally operable in a right-left direction of the vehicle body about the second pivot axis X as the pivot. As shown in FIG. 4, a blocking switch 28 is provided on a lateral outside of the upper block portion 17U. When the operating lever 12 is pivotally operated from a neutral operation position for stopping the traveling electric motor 5 toward the lateral outside of the vehicle body about the second pivot axis X as the pivot, the blocking switch 28 receives pressing operation by the upper block portion 17U to be switched from a blocking state to a blocking release state. As shown in FIG. 3, the blocking switch 28 is linked to the control device 14. The control device 14 includes a blocking means 29. In response to switching operation of the blocking switch 28 to the blocking release state, the blocking means 29 is configured to control the controller 15 to a state of allowing the traveling electric motor 5 to drive, based on information from the blocking switch 28. In more particular, when the operating lever 12 is pivotally operated from its neutral position toward the lateral outside of the vehicle body to switch the blocking switch 28 to the blocking release state, and thereafter the operating lever 12 is pivotally operated from the neutral operation position to the front-rear direction, the traveling electric motor 5 is driven to cause the traveling vehicle body to travel.

Other Embodiments (1) In the foregoing embodiment, the front wheels 1 and the rear wheels 2 are provided each as a traveling device and the traveling electric motors 5 are provided each as a driving device which drives the traveling device, but these are not limitative. Alternatively thereto, there may be provided a crawler type traveling device, or a traveling device including mini crawlers and wheels in combination. Still alternatively, there may be provided a continuously variable transmission in which power from an engine is inputted thereto, and the inputted power is shifted and transmitted to a traveling device, thereby driving the traveling device.

(2) In the foregoing embodiment, the operation lever 12 is configured to be pivotally operated about the pivot axis P1 and the second pivot axis X as the pivots, and the blocking switch 28 is provided, but these are not limitative. Alternatively thereto, an operation lever may have a single (one and only) pivot axis as the pivot, such as only the pivot axis P1, or a single pivot axis extending obliquely relative to the front-rear direction of the vehicle body, and the blocking switch 28 may be omitted.

(3) In the foregoing embodiment, the rotary operation shaft 13b protrudes from the meter case 13a toward the operating lever 12, but this is not limitative. Alternatively thereto, the rotary operation shaft 13b may protrude from the meter case 13a toward the side away from the operating lever 12.

(4) In the foregoing embodiment, the input part 23 is located on the side where the potentiometer 13 is located relative to the operating lever 12, but this is not limitative. Alternatively thereto, the input part 23 and the output part 24 may extend, relative to the pivot axis P1 and the rotary axis P2, away from the side where the operating lever 12 extends; and the input part 23 may be located on the side remote from the side where the potentiometer 13 is located, relative to the operating lever 12.

(5) In the foregoing embodiment, the damper 30 is provided. However, the damper 30 may be omitted.

(6) In the foregoing embodiment, the work vehicle is a mower, but this is not limitative. The invention can be applied to various types of work vehicles such as a transport vehicle.

What is claimed is:

1. A work vehicle comprising:
a traveling device;
a driving device which drives the traveling device;
an operating lever which performs speed change operation of the driving device;
a potentiometer which detects an operation position of the operating lever;
a controlling means which operates speed change of the driving device based on a detection result of the potentiometer; and
an interlocking mechanism which interlocks the operating lever with a rotary operation shaft of the potentiometer;
wherein a pivot axis of the operating lever and a rotary axis of the rotary operation shaft are located on a same axis, and
wherein the interlocking mechanism includes:
an input part which pivots following the operating lever about the pivot axis of the operating lever as a pivot, and inputs power of the operating lever, the input part comprising a first through hole,
an output part which is supported to the rotary operation shaft of the potentiometer and outputs power of the input part to the rotary operation shaft, the output part comprising a second through hole, and
a connecting pin extending between the first through hole and the second through hole, thereby operably connecting the input part and the output part with each other.

2. The work vehicle according to claim 1, wherein the rotary operation shaft protrudes from a meter case of the potentiometer to a side where the operating lever is located.

3. The work vehicle according to claim 1, wherein the input part is located on a side where the potentiometer is located, relative to the operating lever.

4. The work vehicle according to claim 1, further comprising:
a damper which is connected to the input part and which acts on the operating lever.

5. A work vehicle comprising:
a traveling device;
a driving device which drives the traveling device;
an operating lever which performs speed change operation of the driving device;
a potentiometer which detects an operation position of the operating lever;
a controlling means which operates speed change of the driving device based on a detection result of the potentiometer; and
an interlocking mechanism which interlocks the operating lever with a rotary operation shaft of the potentiometer;
wherein a pivot axis of the operating lever and a rotary axis of the rotary operation shaft are located on a same axis, and
wherein the interlocking mechanism includes:
an input part which pivots following the operating lever about the pivot axis of the operating lever as a pivot, and inputs power of the operating lever,
an output part which is supported to the rotary operation shaft of the potentiometer and outputs power of the input part to the rotary operation shaft, and
a connecting pin which operably connects the input part and the output part with each other, and wherein the work vehicle further comprises a damper connected to the input part and which acts on the operating lever.

6. The work vehicle of claim 5, wherein the rotary operation shaft protrudes from a meter case of the potentiometer to a side where the operating lever is located.

7. The work vehicle of claim 5, wherein the input part is located on a side where the potentiometer is located, relative to the operating lever.

* * * * *